(12) United States Patent
Buchanan (10) Patent No.: US 9,816,475 B1
(45) Date of Patent: Nov. 14, 2017

(54) SYSTEM AND METHOD FOR MAXIMIZING SHORT-TERM ENERGY STORAGE IN A SUPERCAPACITOR ARRAY FOR ENGINE START APPLICATIONS

(71) Applicant: Cooper Technologies Company, Houston, TX (US)

(72) Inventor: Marlowe James Buchanan, Lake Oswego, OR (US)

(73) Assignee: Cooper Technologies Company, Houston, TX (US)

( * ) Notice: Subject to any disclaimer, the term of this patent is extended or adjusted under 35 U.S.C. 154(b) by 7 days.

(21) Appl. No.: 15/151,981

(22) Filed: May 11, 2016

(51) Int. Cl.
*F02N 11/00* (2006.01)
*H02P 9/04* (2006.01)
*H02J 7/00* (2006.01)
*F02N 11/08* (2006.01)
*H02J 7/34* (2006.01)

(52) U.S. Cl.
CPC ........ *F02N 11/0866* (2013.01); *H02J 7/0054* (2013.01); *H02J 7/345* (2013.01)

(58) Field of Classification Search
USPC ........................................ 290/38 R; 320/166
See application file for complete search history.

(56) References Cited

U.S. PATENT DOCUMENTS

| | | | |
|---|---|---|---|
| 5,157,267 A | 10/1992 | Shirata et al. | |
| 6,325,035 B1* | 12/2001 | Codina | F02N 11/0866 123/179.1 |
| 7,145,259 B2 | 12/2006 | Spellman et al. | |
| 7,319,306 B1* | 1/2008 | Rydman | F02N 11/0866 320/166 |
| 7,740,092 B2* | 6/2010 | Bender | B60K 6/28 180/65.29 |
| 7,869,911 B2* | 1/2011 | Yamaguchi | B60K 1/00 180/65.23 |
| 7,963,264 B2 | 6/2011 | Reynolds | |
| 8,134,343 B2 | 3/2012 | Like et al. | |
| 8,179,103 B2 | 5/2012 | Doljack | |
| 8,946,926 B2* | 2/2015 | Eger | B60K 6/30 307/10.1 |
| 9,162,669 B2* | 10/2015 | Dziuba | B60W 20/10 |
| 9,397,513 B2* | 7/2016 | Butler | H02J 7/0054 |

(Continued)

*Primary Examiner* — Pedro J Cuevas
(74) *Attorney, Agent, or Firm* — Ziolkowski Patent Solutions Group, SC (57) ABSTRACT

A system for starting an internal combustion engine includes a battery system, a charger to receive DC battery power from the battery system and convert the power to a DC charging current, a supercapacitor array having a plurality of supercapacitor cells connected to the charger to receive the DC charging current therefrom, and a motor starter to start the internal combustion engine responsive to a DC input from the supercapacitor array. The charger modifies a voltage of the supercapacitor cells in an on-demand fashion, with the charger programmed to provide DC charging current to the supercapacitor array to hold the supercapacitor cells at a first voltage, receive a bump-up command indicative of an upcoming engine start and, responsive to receiving the bump-up command, provide DC charging current to the supercapacitor array to increase a voltage of the supercapacitor cells temporarily to a second voltage higher than the first voltage.

20 Claims, 5 Drawing Sheets

(56) References Cited

U.S. PATENT DOCUMENTS

| | | | | |
|---|---|---|---|---|
| 9,534,574 | B2* | 1/2017 | Maeda | F02N 11/0825 |
| 9,689,366 | B2* | 6/2017 | Kirlew | F02N 11/0866 |
| 2003/0214270 | A1* | 11/2003 | Shiue | H03K 3/53 |
| | | | | 320/166 |
| 2004/0124811 | A1* | 7/2004 | Kok | B60R 16/03 |
| | | | | 320/167 |
| 2006/0133007 | A1* | 6/2006 | Shiue | H02P 7/04 |
| | | | | 361/301.2 |
| 2007/0068714 | A1* | 3/2007 | Bender | B60W 20/10 |
| | | | | 180/65.29 |
| 2007/0164693 | A1* | 7/2007 | King | B60K 6/28 |
| | | | | 318/109 |
| 2008/0315829 | A1* | 12/2008 | Jones | H02J 7/345 |
| | | | | 320/103 |
| 2011/0083919 | A1* | 4/2011 | Kshatriya | B60W 20/15 |
| | | | | 180/65.26 |
| 2016/0049819 | A1* | 2/2016 | Butler | H02J 7/0054 |
| | | | | 320/105 |
| 2016/0297311 | A1* | 10/2016 | Butler | H02J 7/0054 |
| 2016/0327007 | A1* | 11/2016 | Averbukh | F02N 11/0866 |

* cited by examiner

SYSTEM AND METHOD FOR MAXIMIZING SHORT-TERM ENERGY STORAGE IN A SUPERCAPACITOR ARRAY FOR ENGINE START APPLICATIONS

BACKGROUND OF THE INVENTION

Embodiments of the invention relate generally to an energy storage device used in an engine starting application and, more particularly, to a supercapacitor array and method of charging thereof in a controlled manner to maximize energy extraction and array lifetime.

Motor vehicles typically utilize a starter motor for starting the vehicle's engine. The starter motor is supplied with electrical energy from a battery, such as a lead-acid storage battery. The battery is typically charged by an alternator while the motor vehicle is running. When the battery is discharged to a level below that of a threshold start voltage, the battery, by itself, cannot supply an adequate current to the starter motor at the time of starting the engine.

Figure 1:
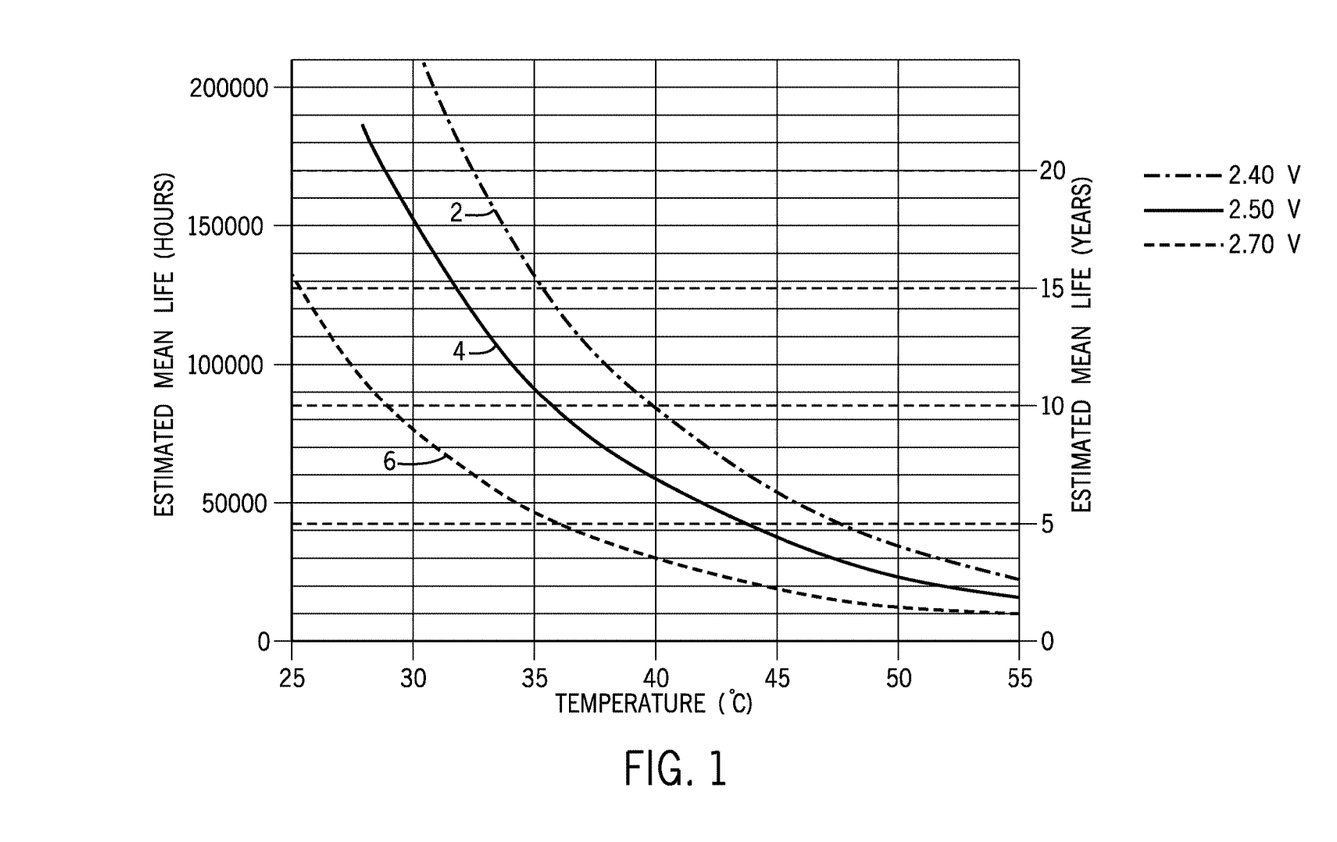
FIG. 1 is a graph illustrating an estimated mean life for a supercapacitor array at a number of different cell voltage levels.

With specific regard to heavy trucking applications, it has been previously recognized that double insulated capacitors—i.e., supercapacitors—are beneficial to supplement and indeed replace lead-acid batteries in starting the engine. More specifically, supercapacitors provide a very low impedance high power source that enables a starter motor to successfully crank and start an engine, even under adverse conditions such as extreme cold that might prevent a battery from accomplishing that task. In typical applications, the voltage/potential of the cells of a supercapacitor array (as for engine starting) are held at less than their max rated voltage when the cells are above 0° C. via operation of an associated charger. The cells are held at a lower (i.e., less than their max rated) voltage at such temperatures because it is recognized that excessively charging the cells to a higher voltage may degrade the cells—with FIG. 1 illustrating a reduction in the operating lifetime of cells in a supercapacitor array via curves 2, 4, 6 that show an estimated mean life for a cell when charged to 2.4 V, 2.5 V, and 2.7 V, respectively, at various temperatures. Upon the temperature of the cells dropping below a lower threshold of perhaps 0° C., the charger then automatically increases the voltage/potential of the cells of the supercapacitor array (e.g., to their max rated voltage), such that the energy storage in the supercapacitor array is maximized when it is most needed—during engine start-up at cold temperatures when there is increased viscosity of cold engine oils. In charging the supercapacitor array to its max rated voltage, and in order to not excessively discharge the system battery, a general strategy is for the charger to bring the supercapacitor array up to the max rated voltage and then shut the charger down, reducing its quiescent draw from the battery to something negligible.

While the above described technique for charging the supercapacitor array—with the voltage/potential of the cells of the supercapacitor array being held at a useful level but less than their max rated voltage when the cells are above 0° C. and being increased (e.g., to their max rated voltage) when the temperature of the cells drops below 0° C.—is effective with regard to providing a needed voltage boost during cold weather hard starting of the engine, it is recognized that this technique may not be ideal for maximizing energy extraction from the supercapacitor array. First, because during warm conditions the technique holds the supercapacitor array at a relatively constant voltage indefinitely, that voltage and corresponding stored charge must be reduced to support long life of the cells—providing continuous higher voltage during warm conditions is not an option. Second, as the charger is shut down during cold temperatures upon bringing the supercapacitor array up to its max rated voltage, the self discharge (leakage) currents of the cells and other parasitic loads over the following hours after charging may slowly discharge the supercapacitor array until it hits a lower threshold, at which point the charger turns back on and refreshes the lost charge and again cycles off. Accordingly, if a given design implements 1 V or even just 0.5 V of charge hysteresis, a user cannot be assured when attempting to start a cold truck whether the expected max rated voltage boost is available for the starter or whether instead some lower voltage down to the refresh threshold is only available.

While the technique for charging a supercapacitor array is discussed above with respect to engine starting in a heavy trucking application, it is recognized that other non-mobile industrial applications and machines may have a similar battery-supercapacitor-starter topology. Thus, machines such as large gas or diesel powered generators or pumps may include supercapacitors to ensure engine starting in environments that are difficult for traditional batteries. As set forth above, existing techniques for selectively holding and increasing the voltage/potential of the cells of the supercapacitor array are effective with regard to selectively providing a needed voltage boost during some occurrences of hard starting of the engine, but are not ideal for maximizing energy extraction from the supercapacitor array.

Therefore, it is desirable to provide a supercapacitor array and technique of charging thereof that provides a max rated voltage to be drawn from a supercapacitor array on-demand in heavy vehicle and non-mobile industrial applications. It is further desirable for such an on-demand max rated voltage to be available from the supercapacitor array in such a fashion so as to minimize the impact on the operational lifetime of the supercapacitor array.

BRIEF DESCRIPTION OF THE INVENTION

In accordance with one aspect of the present invention, a system for starting an internal combustion engine includes a battery system that stores and outputs a DC battery power therefrom, a charger connected to the battery system to receive the DC battery power therefrom and convert the DC battery power to a DC charging current, a supercapacitor array connected to the charger to receive the DC charging current therefrom and comprising a plurality of supercapacitor cells, and a motor starter configured to start the internal combustion engine responsive to receiving a direct current (DC) input from the supercapacitor array. The charger is configured to provide for modifying a voltage of the plurality of supercapacitor cells in an on-demand fashion, with the charger being programmed to provide DC charging current to the supercapacitor array to hold the plurality of supercapacitor cells at a first voltage, receive a bump-up command indicative of an upcoming engine start and, responsive to receiving the bump-up command, provide DC charging current to the supercapacitor array to increase a voltage of the plurality of supercapacitor cells to a second voltage that is higher than the first voltage.

In accordance with another aspect of the present invention, a charger is provided for charging an arrangement of supercapacitor cells in a starting system for an internal combustion engine with a starter that runs from a battery system that is recharged from the internal combustion engine when running. The charger includes a DC-DC converter configured to convert a DC battery power received from a DC battery to a DC charging current for output to the arrangement of supercapacitor cells, a control module operably connected to the DC-DC converter to control operation of the DC-DC converter for outputting the DC charging current, and a bump-up command module operably connected to the control module to selectively transmit a bump-up command thereto. The control module is programmed to receive a bump-up command from the bump-up command module and, responsive to receiving the bump-up command, cause the DC-DC converter to output DC charging current to the arrangement of supercapacitor cells to temporarily increase a voltage of the arrangement of supercapacitor cells to a higher start-up voltage.

In accordance with yet another aspect of the present invention, a system is provided for starting an internal combustion engine of a machine that comprises a starter for starting the internal combustion engine and that runs from a battery system that is recharged from the internal combustion engine when running. The system includes a battery system comprising one or more batteries configured to store and output a DC battery power therefrom, a charger connected to the battery system to receive the DC battery power therefrom and convert the DC battery power to a DC charging current, a supercapacitor array connected to the charger to receive the DC charging current therefrom and comprising a plurality of supercapacitor cells, and a bump-up command module operably connected to the charger to selectively transmit a bump-up command thereto. The charger, upon receipt of the bump-up command from the bump-up command module, is programmed to provide DC charging current to the supercapacitor array to increase a voltage of the plurality of supercapacitor cells to a higher engine start-up voltage.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

Embodiments of the invention are directed to a supercapacitor array and charger-implemented method of charging thereof in a controlled manner to maximize energy extraction and array lifetime. A charger included as part of a system for starting an internal combustion engine of a motor vehicle is programmed to temporarily bump-up a voltage of the supercapacitor array in an on-demand fashion, so as to maximize a voltage available from the supercapacitor array when starting the engine without significantly impacting the operational lifetime of the supercapacitor array.

Embodiments of the invention are described below as being directed to a system for starting an internal combustion engine in construction, agriculture, heavy trucking, and other specialty vehicles—with such vehicles including, for example, asphalt pavers, large tractors, road graders, field harvesters, and so forth. However, it is recognized that the charger and method performed thereby for charging the supercapacitor array may be incorporated in passenger vehicles and in other devices/machines that utilize a supercapacitor array as part of a start-up operation. Examples of other machines with which embodiments of the invention might be implemented include non-mobile or stationary machines with an internal combustion engine that needs to be started from its battery(s), such as large gas or diesel powered generators or pumps or a fixed plant that burns fuel to do some useful work and which has a starter motor connected to battery(s) that it charges when operating.

Figure 2:
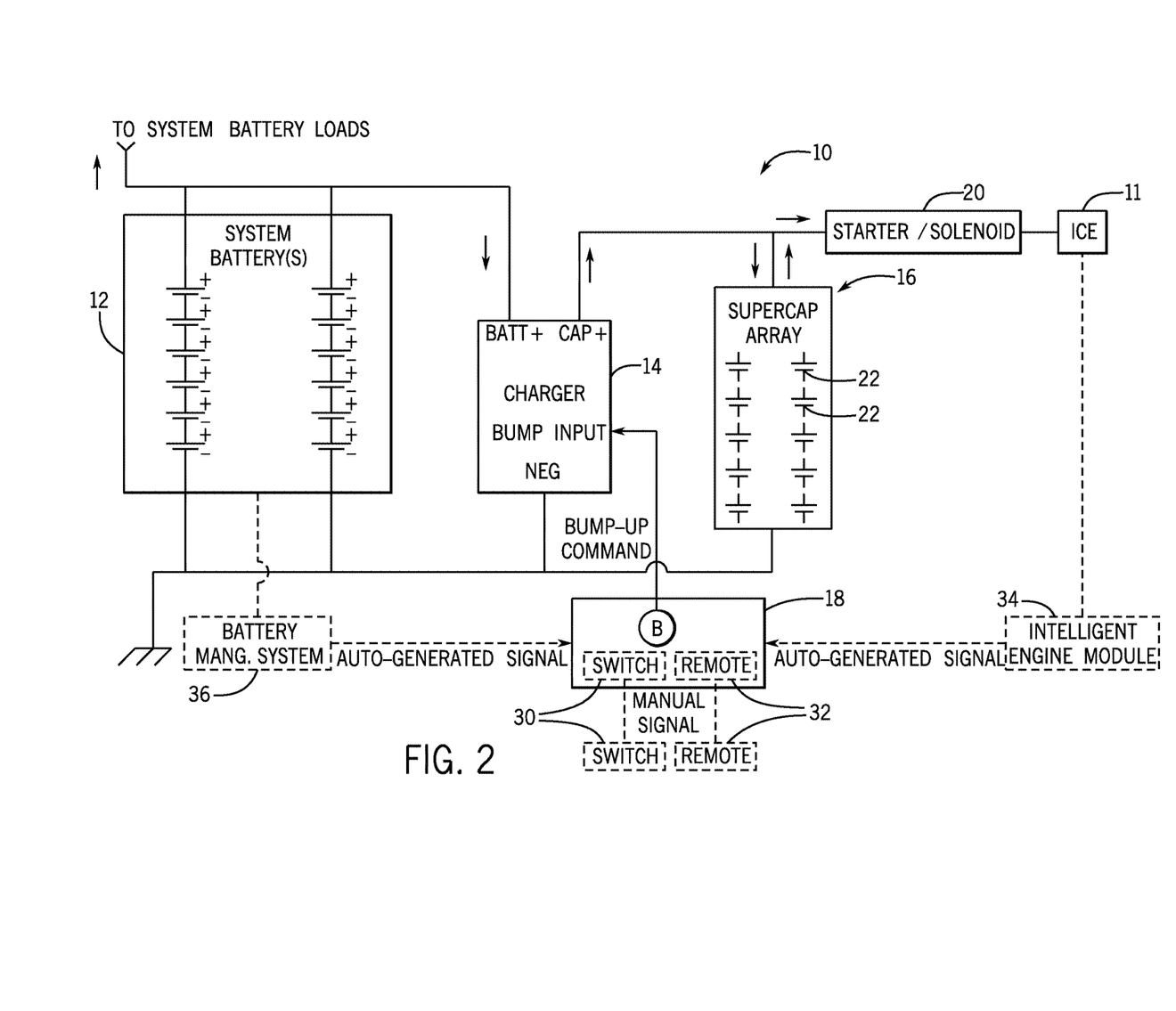
FIG. 2 is a block schematic diagram of a system for starting an internal combustion engine of a motor vehicle, according to an embodiment of the invention.

Referring to FIG. 2, a block schematic diagram of a system 10 for starting an internal combustion engine 11 is illustrated according to an embodiment of the invention. The system generally includes a battery system 12, charger 14, capacitor array 16, bump-up command module 18, and starter 20. As explained in greater detail below, battery system 12 provides power to the charger 14, with the charger 14 being selectively controlled to output a charging current to the capacitor array 16 to hold the voltage of the capacitor array 16 at a desired level and "bump-up" the voltage of the capacitor array 16 in an on-demand fashion responsive to a bump-up command received from the bump-up command module 18—so as to provide a maximum voltage to starter 20 from capacitor array 16 when a start-up of the internal combustion engine 11 is to be performed.

The battery system 12 is provided as a standard starting, lighting, ignition (SLI) battery that functions to provide power for starting the engine 11 and power different auxiliary loads/devices in the vehicle (e.g., lighting). The battery system 12 may be formed of one or more 12V lead-acid type batteries in parallel for 12V nominal systems, or may be formed of various other series and parallel combinations of batteries for 24V/42V/48V/or other nominal Voltage systems. While described above as being formed of lead-acid type batteries, it is recognized that battery system 12 may be formed of other batteries of suitable type and voltage characteristics.

With regard to the capacitor array 16, the term "capacitor" is defined herein as an electrical device that can store energy in an electric field between a pair of closely-spaced conductors. The capacitor array 16 is formed of a plurality of such capacitors 22 that can be electrochemical capacitors. In an exemplary embodiment, each of the capacitors 22 is a cylindrical, double-layer, high-density, electrochemical capacitor cell having a capacitance in a range of about 1,200 Farads to about 3,500 Farads—referred to in the art as a "supercapacitor" or "ultracapacitor." The supercapacitor cells 22 have low internal resistance and are capable of yielding high energy and high current density over considerable time periods and may be conveniently fabricated by lamination of electrode and separator films prepared from polymeric compositions comprising activated carbon and ion-conductive electrolyte. In general, a supercapacitor cell 22 can hold a very high charge which can be released relatively quickly, thereby making it very suitable for starting a vehicle, since the vehicle cranking operation lasts for a very short period of time during which high cranking power is required.

Figure 3:
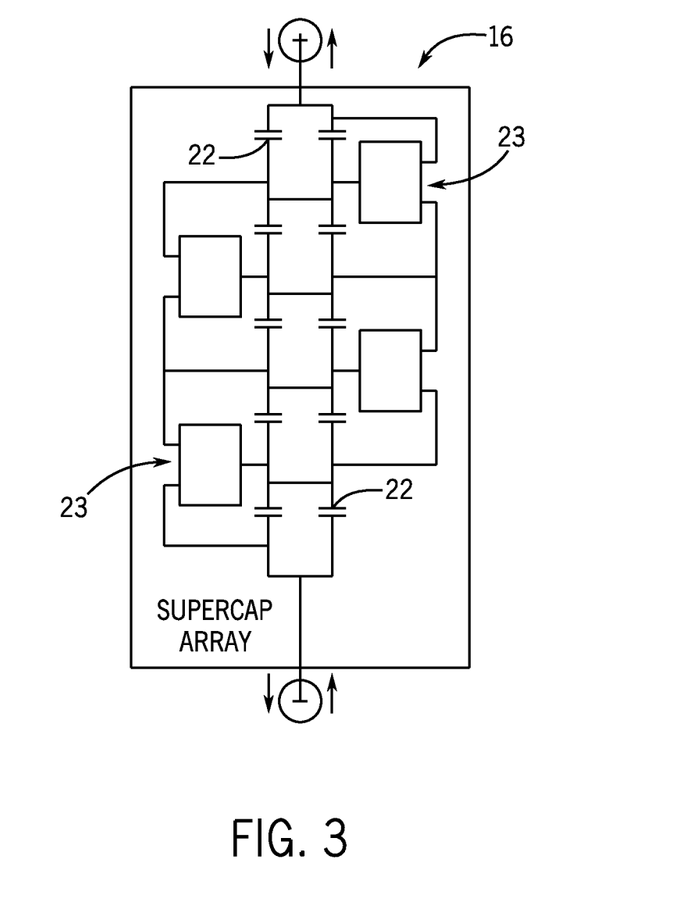
FIG. 3 is block schematic diagram of the supercapacitor array of FIG. 2 with balancing circuitry included therein, according to an embodiment of the invention.

Referring now to FIG. 3, a detailed view of the supercapacitor array 16 is shown according to one embodiment of the invention—with FIG. 3 illustrating that the supercapacitor array 16 includes ten supercapacitor cells 22—formed of two parallel connected rows of five series connected cells (5S2P). It is recognized, however, that the supercapacitor array 16 may include a greater or lesser number of supercapacitor cells 22. For example, the supercapacitor array 16 may be formed of two parallel connected rows of six series connected cells (6S2P) or formed of one row of six series connected cells (6S1P). Thus, the capacitance of the supercapacitor array 16, and consequently its energy capacity, may be adjusted by altering the sizes, number and/or capacitance of the supercapacitor cells 22 therein. As further shown in FIG. 3, a balancing circuit 23 may be built into the supercapacitor array 16 that operates to take charge away from cells 22 that have a higher voltage across them than other cells 22 in the array. In operation, the balancing circuit prevents any differences in cell leakage currents or initial capacitance in the cells 22 from resulting in the cells 22 being at different voltages. Thus, balancing of the cell voltages can prevent an increased degradation/aging of cells 22 that might occur were certain cells to have a higher voltage than other cells in the array.

Figure 4:
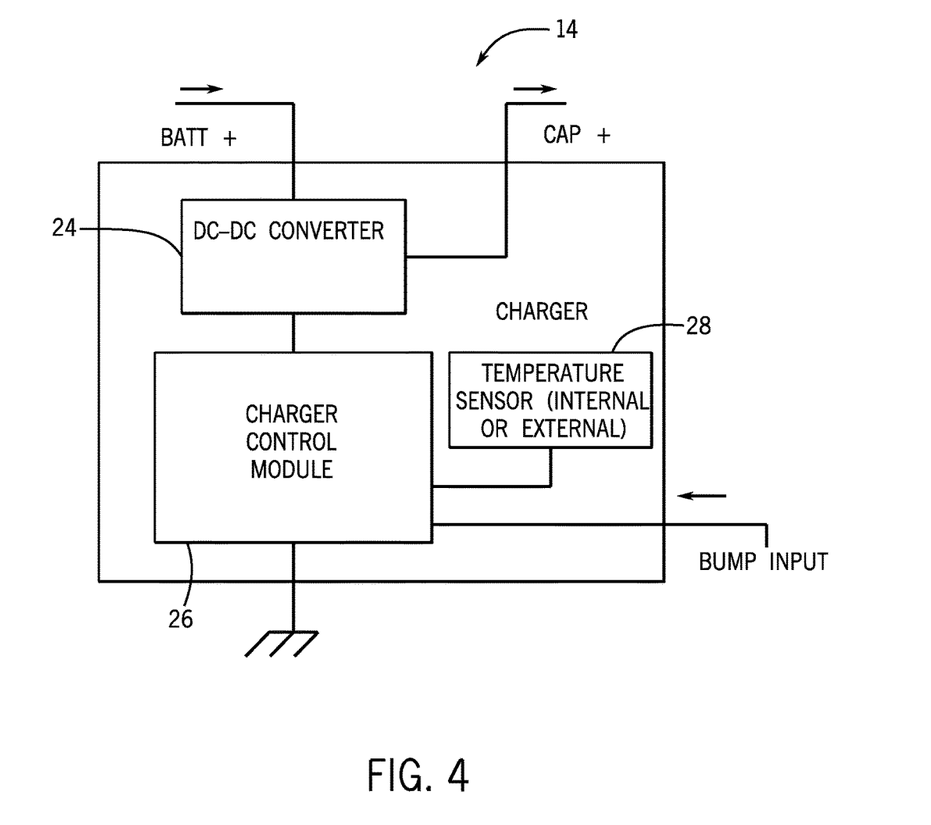
FIG. 4 is block schematic diagram of the charger of FIG. 2, according to an embodiment of the invention.

The charger 14 is coupled to the battery system 12 and the supercapacitor array 16 so as to receive the DC battery power output from the battery system 12 and transmit/output a DC charging current to the supercapacitor array 16. As shown in FIG. 4, in one embodiment, the charger 14 is comprised of a DC-DC converter 24, a control module 26 operably connected to the DC-DC converter 24, and optionally a temperature sensor 28 that provides an input to the control module 26. The DC-DC converter 24 may be of a known construction and thus include an arrangement of transistors, resistors, capacitors, inductors and diodes (not shown) that collectively function to receive the DC battery power and perform a power conversion operation thereon to generate and output a DC charging current that can raise a discharged supercapacitor array 16 to a desired voltage threshold which may be either higher or lower than that supplied by the battery system 12. In an exemplary embodiment, the charger 14 is sized to enable increasing of the voltage of the supercapacitor cells 22 from the first voltage to the second voltage within an acceptably short time period, possibly 30-120 seconds for example. It will be obvious to someone skilled in the art that that a higher capacity charger 14 could be utilized to push current into the array 16 faster and therefore further reduce the charging time for increasing of the voltage of the supercapacitor cells 22 from the first voltage to the second voltage (and to recharge after a cranking event); however, such a charger—besides being larger and costing more—will more readily overwhelm a very weak battery and thus specific system applications will have to weigh user concern for amount of delay time during charging versus cost and ability to start from extremely weak battery(s) when selecting a charger 14.

The control module 26 of charger 14 is programmed to control operation of the DC-DC converter 24 based on one or more inputs received thereby indicating an optimal voltage level at which the cells 22 of the supercapacitor array 16 are to be held at or boosted to. With respect to the functioning of the DC-DC converter 24 of charger 14 to "hold" the voltage level of the cells 22 of the supercapacitor array 16 at a particular level, it is to be understood that the term "hold" or "holding" as used hereafter refers to the functioning of the charger 14 to charge the supercapacitor array 16 up to some voltage threshold, then shutting down and not restarting until the array has self-discharged down to a somewhat lower voltage (e.g., 0.5V or 1V below the threshold). Upon the array 16 falling below the threshold by a certain amount, the charger 14 again functions to charge the array 16 back up to the desired upper threshold, with the charger 14 continuing to alternately operate in such charging and non-charging modes so as to in effect "hold" the voltage of the supercapacitor array 16 at a relatively constant level or set-point continuously. In then boosting the voltage, the charger 14 functions to (temporarily) increase the voltage of the cells 22 of the supercapacitor array 16 above the constant voltage level or set-point at which the cells are typically held.

In a first functioning or operation of the control module 26, the control module 26 receives a bump-up command from the bump-up command module 18 that signals the control module 26 to cause the DC-DC converter 24 of charger 14 to provide a DC charging current to the supercapacitor array 16 and bump-up the voltage of the cells 22 of the supercapacitor array 16 from a first, long-term holding voltage to a second and higher start-up voltage. The bump-up command indicates that a start-up of the internal combustion engine 11 is imminent or will occur in the near future (e.g., within the next 5 minutes), such that a bump-up of the voltage of the cells 22 of the supercapacitor array 16—such as to a max-rated voltage of the cells 22—will be available (and supplied to starter 20) for assisting in start-up of the internal combustion engine 11. As shown in FIG. 2, the bump-up command may be generated by the bump-up command module 18 responsive to a signal manually generated by an operator or responsive to a signal automatically generated by a component or monitoring device of the system 10.

In one embodiment, a manual switch actuatable by an operator may be incorporated into the bump-up command module 18 or operably connected thereto—with the manual switch 30 generating a signal that indicates that a bump-up command should be generated. Thus, upon operator actuation of the switch 30 indicating that an engine start-up is to occur in the near future, a signal is provided to bump-up command module 18 that causes the bump-up command module 18 to generate and transmit a bump-up command to the control module 26 of charger 14—such that the DC-DC converter 24 is caused to provide a DC charging current to the supercapacitor array 16 and bump-up the voltage thereof to a desired higher (i.e., max rated) voltage.

In another embodiment, a remote control device 32 actuatable by an operator may be incorporated into the bump-up command module 18 or operably connected thereto—with the remote control device 32 generating a signal that indicates that a bump-up command should be generated. Upon operator actuation of the remote control device 32 indicating that an engine start-up is to occur in the near future, a signal is provided to bump-up command module 18 that causes the bump-up command module 18 to generate and transmit a bump-up command to the control module 26 of charger 14—such that the DC-DC converter 24 is caused to provide a DC charging current to the supercapacitor array 16 and bump-up the voltage thereof to a desired higher (i.e., max rated) voltage.

In an embodiment where a signal is automatically generated and provided to the bump-up command module 18 for purposes of generating a bump-up command, one of several components or monitoring devices may be employed to auto-generate such a signal. In one embodiment, an "intelligent engine module" 34 may be utilized that tracks and monitors previous start-ups of the engine 11 for purposes of identifying a start-up schedule and a previous cranking time history, and monitors engine temperature amongst other parameters. This information regarding engine temperature and typical engine start-up times and cranking time history allows the intelligent engine module 34 to identify when a next start-up might occur and/or when there might be difficulty in starting the engine 11, such that a bump-up of the supercapacitor array voltage might be desirable. Responsive to such an identified event/condition, the intelligent engine module 34 may provide an input signal to the bump-up command module 18 that causes the bump-up command module 18 to generate and transmit a bump-up command to the control module 26 of charger 14—such that the DC-DC converter 24 is caused to provide a DC charging current to the supercapacitor array 16 and bump-up the voltage thereof to a desired higher voltage.

In another embodiment, a battery management system 36 may be utilized that tracks and monitors one or both of a state-of-charge (SOC) and state-of-health (SOH) of the battery in system 12, along with other system factors that might normally be known to an intelligent engine module. In one embodiment, the battery management system 36 may be a typical battery management system that manages operation/charging of the battery system and, in such a case the battery management system 36 could provide a bump-up input signal to the bump-up command module 18 based on a sensed very low SOC/SOH of the battery, the intent being to maximize supercapacitor array stored energy so as to increase the probability of a successful future engine start on the first attempt, prior to complete exhaustion of the battery system 12. In another embodiment, the battery management system 36 may function more as an intelligent engine module, where the battery management system determines whether a bump-up command should be generated based on the sensed SOC/SOH or other system factors. If it is determined by the battery management system 36 that the voltage of the supercapacitor array 16 should be bumped-up, the battery management system 36 may provide a signal to the bump-up command module 18 that automatically causes the bump-up command module 18 to generate and transmit a bump-up command to the control module 26 of charger 14—such that the DC-DC converter 24 is caused to provide a DC charging current to the supercapacitor array 16 and bump-up the voltage thereof to a desired higher voltage.

In a typical second functioning or operation of the control module 26, the control module 26 receives an input from the temperature sensor 28 indicative of a temperature of the supercapacitor array 16. Based on the sensed temperature of the supercapacitor array 16, the control module 26 may selectively cause the DC-DC converter 24 to supply a DC charging current to the supercapacitor array 16 to hold the cells 22 at a desired voltage. As an example, if the input from the temperature sensor 28 indicates that the temperature of the supercapacitor cells 22 is above 0° C., the control module 26 causes the DC-DC converter 24 to supply a DC charging current to the supercapacitor array 16 to hold the cells 22 at a lower stand-by or holding voltage of perhaps 2.5 V per cell, while if the input from the temperature sensor 28 indicates that the temperature of the supercapacitor cells 22 is below 0° C., the control module 26 causes the DC-DC converter 24 to supply a DC charging current to the supercapacitor array 16 to hold the cells 22 at a higher voltage of perhaps 2.7 V per cell.

In an exemplary embodiment of the invention, the control module 26 of charger 14 also uses the input from the temperature sensor 28 (indicative of a temperature of the supercapacitor array 16) to determine an appropriate or acceptable voltage to which the cells 22 of supercapacitor array 16 may be bumped. That is, rather than charger 14 operating only to provide a set bump-up in voltage from a holding voltage to a fixed/pre-determined start-up voltage, such as a fixed bump-up of 0.2 V/cell from 2.5V/cell to 2.7V/cell for example, the charger 14 may operate to size the bump-up as a function of the array temperature. Such a varying of the bump-up size could be a continuous function that starts, for example, at a 0.2V/cell bump that linearly drops to a 0V/cell bump if the temperature of the supercapacitor array 16 reaches 40° C. Alternatively, a varying of the bump-up size could be applied as a series of fixed steps that get smaller as temperature gets higher. Accordingly, the charger 14 may function to protect the health and longevity of the cells 22 of the supercapacitor array 16 by ensuring that the voltage thereof is not bumped up by too large an amount to a voltage that might significantly degrade or damage the cells when they are at a hotter temperature.

Thus, by use of a bump-up command being provided to charger 14, the charger 14 may be employed to provide an on-demand voltage boost or increase to the cells 22 in the supercapacitor array 16—such as a voltage boost/increase being provided just prior to start-up of the engine 11 and subsequent depleting of the energy in the supercapacitor array 16. This providing of an on-demand voltage boost/increase to the cells 22 in the supercapacitor array 16 by charger 14 ensures that a maximum voltage can be extracted from the supercapacitor array 16 by the starter 20 during an engine start-up—during both cold and warm temperature starts. As the charger 14 provides only a single and temporary voltage boost/increase to the cells 22 in the supercapacitor array 16 responsive to a bump-up command, there is no holding of the voltage of the cells 22 at a high level for a prolonged duration—such that the temporary voltage boost/increase has only a minimal impact on the operational lifetime of the supercapacitor array 16.

Figure 5:
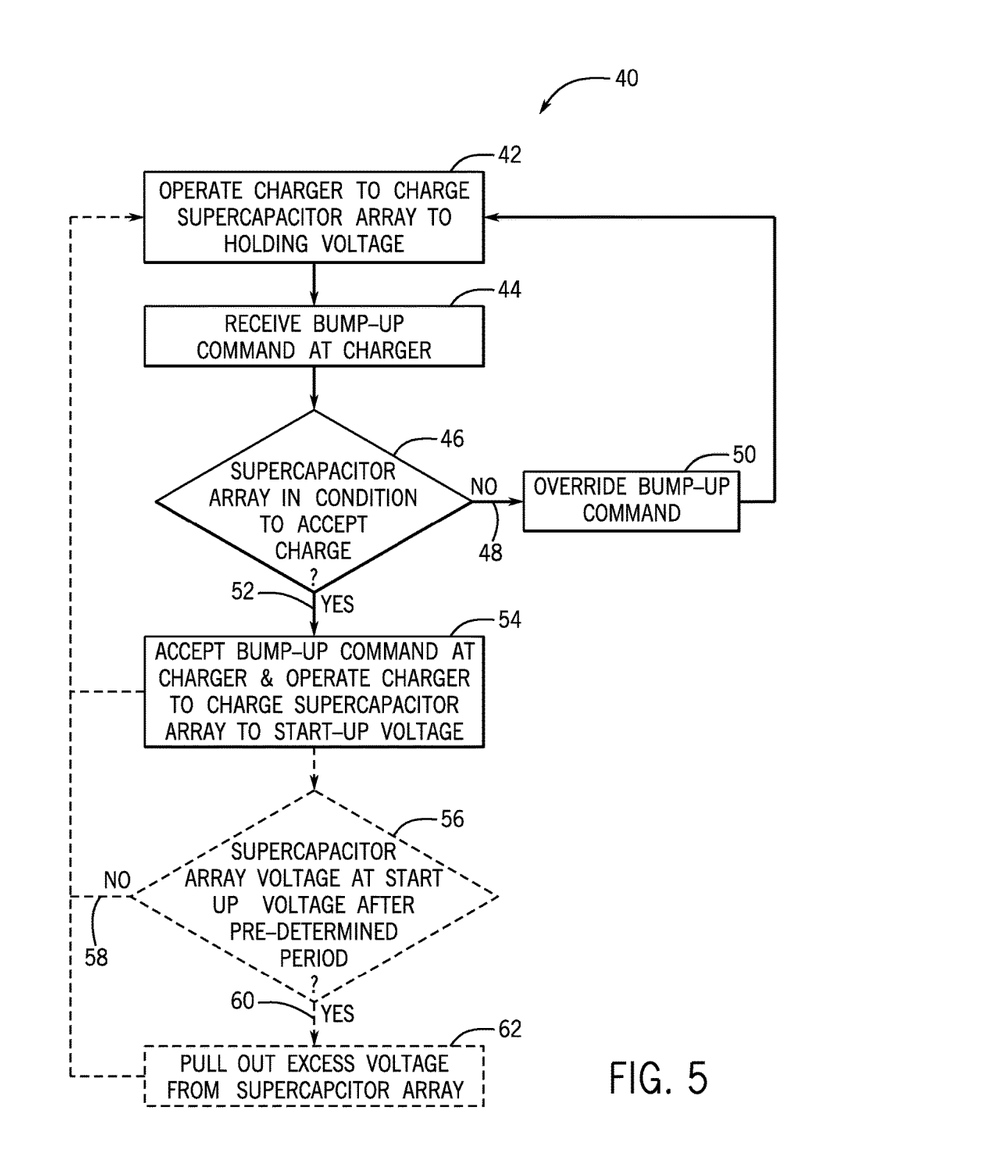
FIG. 5 is a flowchart illustrating a technique for controlling voltage of a supercapacitor array via an associated charger in an on-demand and temporary fashion, according to an embodiment of the invention.

Referring now to FIG. 5, and with continued reference to FIGS. 2-4, a flowchart illustrating a charger-implemented technique 40 for controlling voltage of a supercapacitor array 16 in an on-demand fashion is provided, according to an embodiment of the invention. The technique 40 begins at STEP 42 by operating the charger 14 to selectively provide a DC charging current to the supercapacitor array 16 so as to cause the cells 22 of the supercapacitor array 16 to be held at an acceptable long-term useful holding voltage ("first voltage"). This holding voltage is a reasonably high but less than max rated voltage of the cells 22, e.g., 2.5 V per cell, that is acceptable for maintaining a long operational life of the supercapacitor array 16.

At STEP 44, the charger 14 receives a bump-up command as an input thereto, with the bump-up command indicating to the charger 14 that a start-up of the engine 11 is imminent or will be occurring shortly, such that it is desirable to provide a DC charging current to the supercapacitor array 16 to cause the cells 22 of the supercapacitor array 16 to be boosted to an increased start-up voltage ("second voltage") that is greater than the holding voltage. The bump-up command is provided via a bump-up command module 18 that may be in the form of, or in communication with, any of a number of components that may cause the bump-up command to be generated responsive to a manually or automatically generated signal. In one embodiment, the bump-up command module 18 incorporates therein or is operably connected to one or more of a manual switch 30 and a remote control device 32 that is actuatable by an operator to generate a signal that indicates that a bump-up command should be generated and transmitted to control module 26 of charger 14, with the manual switch 30 and/or remote control device 32 being actuated by an operator from within the vehicle or as the operator approaches the vehicle when it is desired to perform a start-up of the engine 11.

In another embodiment, the bump-up command module 18 is operably connected to one or more of an intelligent engine module 34 and a battery management system 36 that are configured to auto-generate a signal that indicates that a bump-up command should be generated and transmitted to control module 26 of charger 14. The signal may be auto-generated responsive to a sensed engine temperature, estimated scheduled engine start-up time, and/or identified cranking time history (via the intelligent engine module 34) and/or may be auto-generated responsive to a sensed SOC/SOH of the battery 12 in system 10 (via the battery management system 36), with such sensings/determinations indicated that a boosting of the voltage in the supercapacitor array 16 is desired.

In an exemplary embodiment of technique 40, upon receiving the bump-up command at STEP 44, the technique continues to STEP 46 where a determination is made as to whether the supercapacitor array 16 is in a condition to accept a bump-up voltage provided by the charger 14. In an exemplary embodiment, a temperature of the supercapacitor array 16 is measured (via temperature sensor 28) and provided to the control module 26 charger 14 and is subsequently compared to a pre-determined temperature threshold (e.g., 40° C.) above which increasing the voltage of the supercapacitor array 16 to the bump-up voltage may cause damage to the array, e.g., excessively shortening the operational lifetime of the array.

If it is determined at STEP 46 that the temperature of the supercapacitor array 16 is above the pre-determined temperature threshold (such that the supercapacitor array 16 is not in a condition to accept a bump-up voltage), as indicated at 48, then the technique continues to STEP 50—where an override of the bump-up command is performed so as to prevent the voltage of the supercapacitor array 16 from being increased from its present level. By preventing the bump-up command from being acted on by the control module 26, the supercapacitor array 16 is not overstressed and the potential damage to the supercapacitor array may be prevented. Upon implementing the override at STEP 50, the technique 40 may loop back to STEP 42—where the charger 14 acts to provide DC charging current to the supercapacitor array 16 as required to cause the cells 22 of the supercapacitor array 16 to be brought up to and held at the long-term holding voltage.

If it is determined at STEP 46 that the temperature of the supercapacitor array 16 is not above the pre-determined temperature threshold (such that the supercapacitor array 16 is in a condition to accept a bump-up voltage), as indicated at 52, then the technique continues to STEP 54—where the bump-up command is accepted by the control module 26 of charger 14 and the DC-DC converter 24 is caused to provide a DC charging current to the supercapacitor array 16 and bump-up the voltage thereof to a desired higher voltage, such as a max rated voltage of the cells 22 that might be 2.7 V per cell, for example. In an exemplary embodiment, the amount of DC charging current provided to the supercapacitor array 16 and the resulting size of the bump-up in voltage experienced by the cells 22 of supercapacitor array 16 is controlled as a function of the temperature of the supercapacitor array 16 (as determined/measured as part of STEP 46). The size of the bump-up provided by charger 14 is varied as a function of the temperature of the supercapacitor array 16—with the size of the bump-up being reduced (either as a continuous function or in a stepped/incremented fashion) as the temperature of the supercapacitor array approaches the pre-determined temperature threshold. The charger 14 provides only a single and temporary voltage boost/increase to the cells 22 in the supercapacitor array 16 responsive to the bump-up command, such that there is no holding of the voltage of the cells 22 at a high level for a prolonged duration. Accordingly, the temporary voltage boost/increase has only a minimal impact of the operational lifetime of the supercapacitor array 16.

In one embodiment of the invention, upon boosting the voltage of the cells 22 in the supercapacitor array 16 to a desired start-up voltage, the technique then loops back to STEP 42, where the charger 14 reverts to functioning to replenish/maintain the voltage of the supercapacitor array 16 charge to the first holding voltage level—with it being recognized that such replenishing/maintaining will occur upon the supercapacitor array having been depleted due to the starting of the engine or, if the engine is not started, upon a piece of the excess bump-up charge being pulled out of the cells 22 with the highest potential over the following minutes to hours and upon subsequent self-discharging until charging is required to bring the supercapacitor array voltage up to the long-term holding voltage.

In an alternate and optional embodiment of the invention shown in phantom in FIG. 5, upon boosting the voltage of the cells 22 in the supercapacitor array 16 to a desired start-up voltage, the technique may instead continue at STEP 56 where a sensing of the voltage of the supercapacitor array 16 is performed and a determination as to whether the voltage is still at the start-up voltage level is made. The determination at STEP 56 is made after a pre-determined period of time has passed within which a starting of the engine was expected to be performed. This determination thus indicates whether a start-up of the engine 11 has been performed as predicted/indicated (i.e., indicated via the manual or automatic generation of the bump-up command). If it is determined at STEP 56 that the supercapacitor array voltage is no longer at the increased start-up voltage, as indicated at 58, this indicates that the supercapacitor array has been depleted due to the starting of the engine, as during start-up, the starter 20 draws current from the supercapacitor array 16 so as to deplete the energy stored in the supercapacitor array. Upon depletion of the supercapacitor array 16, the technique then loops back to STEP 42, where the charger 14 acts to provide DC charging current to the supercapacitor array 16 so as to cause the cells 22 of the supercapacitor array 16 to be brought up to and subsequently held at the long-term holding voltage.

If it is determined at STEP 56 that the supercapacitor array voltage is still at the increased start-up voltage, as indicated at 60, this indicates that a starting of the engine has not occurred as expected. The technique 40 thus continues to STEP 62 where the excess voltage bump-up is pulled back out of the supercapacitor array, with the technique then looping back to STEP 42. In one embodiment, the bump-up/excess voltage is pulled out from the supercapacitor array 16 via the charger 14—with the charger performing such a function responsive to a command from the intelligent engine module upon a detection thereby that the intended engine starting or cranking event has not occurred. However, other means/mechanisms may be employed for pulling the excess voltage out of the array, such as via an external load being switched across the supercapacitor array 16 to bring its voltage back down to the normal holding voltage to compensate for a skipped starting event or via a command to bring down the supercapacitor array voltage to its normal hold potential being sent to the array's balancing circuitry, causing it to bring all the cells 22 down to an equal lower level and dissipate the extra energy within the array. Accordingly, the excess voltage may be prevented from remaining in the supercapacitor array 16 for an extended period of hours or days.

Beneficially, embodiments of the invention thus provide a charger-implemented technique for charging a supercapacitor array in a controlled manner to maximize energy extraction and array lifetime. The charger is programmed to temporarily bump-up a voltage of the supercapacitor array in an on-demand fashion responsive to a received bump-up command, so as to maximize a voltage available from the supercapacitor array when starting the engine without significantly reducing the operational lifetime of the supercapacitor array. The bump-up command indicates that a start-up of the engine is desired and may be generated responsive to a manually generated request or an auto-generated request. By temporarily bumping-up a voltage of the supercapacitor array in an on-demand fashion and thereby maximizing the voltage available from the supercapacitor array when starting the engine, the size of the supercapacitor array may, for some applications, be reduced without sacrificing the energy available therefrom as compared to typical supercapacitor array charging techniques. Thus, the charger-implemented technique of the present invention may provide for use of a 5S2P or 5S1P supercapacitor array in some heavy trucking engine start-up systems instead of a 6S2P or 6S1P supercapacitor array, as is typically found in such systems—thereby reducing system cost and complexity.

Therefore, according to an embodiment of the invention, a system for starting an internal combustion engine includes a battery system that stores and outputs a DC battery power therefrom, a charger connected to the battery system to receive the DC battery power therefrom and convert the DC battery power to a DC charging current, a supercapacitor array connected to the charger to receive the DC charging current therefrom and comprising a plurality of supercapacitor cells, and a motor starter configured to start the internal combustion engine responsive to receiving a direct current (DC) input from the supercapacitor array. The charger is configured to provide for modifying a voltage of the plurality of supercapacitor cells in an on-demand fashion, with the charger being programmed to provide DC charging current to the supercapacitor array to hold the plurality of supercapacitor cells at a first voltage, receive a bump-up command indicative of an upcoming engine start and, responsive to receiving the bump-up command, provide DC charging current to the supercapacitor array to increase a voltage of the plurality of supercapacitor cells to a second voltage that is higher than the first voltage.

According to another embodiment of the invention, a charger is provided for charging an arrangement of supercapacitor cells in a starting system for an internal combustion engine with a starter that runs from a battery system that is recharged from the internal combustion engine when running. The charger includes a DC-DC converter configured to convert a DC battery power received from a DC battery to a DC charging current for output to the arrangement of supercapacitor cells, a control module operably connected to the DC-DC converter to control operation of the DC-DC converter for outputting the DC charging current, and a bump-up command module operably connected to the control module to selectively transmit a bump-up command thereto. The control module is programmed to receive a bump-up command from the bump-up command module and, responsive to receiving the bump-up command, cause the DC-DC converter to output DC charging current to the arrangement of supercapacitor cells to temporarily increase a voltage of the arrangement of supercapacitor cells to a higher start-up voltage.

According to yet another embodiment of the invention, a system is provided for starting an internal combustion engine of a machine that comprises a starter for starting the internal combustion engine and that runs from a battery system that is recharged from the internal combustion engine when running. The system includes a battery system comprising one or more batteries configured to store and output a DC battery power therefrom, a charger connected to the battery system to receive the DC battery power therefrom and convert the DC battery power to a DC charging current, a supercapacitor array connected to the charger to receive the DC charging current therefrom and comprising a plurality of supercapacitor cells, and a bump-up command module operably connected to the charger to selectively transmit a bump-up command thereto. The charger, upon receipt of the bump-up command from the bump-up command module, is programmed to provide DC charging current to the supercapacitor array to increase a voltage of the plurality of supercapacitor cells to a higher engine start-up voltage.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for starting an internal combustion engine, the system comprising:
   a battery system that stores and outputs a DC battery power therefrom;
   a charger connected to the battery system to receive the DC battery power therefrom and convert the DC battery power to a DC charging current;
   a supercapacitor array connected to the charger to receive the DC charging current therefrom, the supercapacitor array comprising a plurality of supercapacitor cells; and
   a motor starter configured to start the internal combustion engine responsive to receiving a direct current (DC) input from the supercapacitor array;
   wherein the charger is configured to provide for modifying a voltage of the plurality of supercapacitor cells in an on-demand fashion, the charger being programmed to:
      provide DC charging current to the supercapacitor array to hold the plurality of supercapacitor cells at a first voltage;
      receive a bump-up command indicative of an upcoming engine start; and
      responsive to receiving the bump-up command, provide DC charging current to the supercapacitor array to increase a voltage of the plurality of supercapacitor cells to a second voltage that is higher than the first voltage.

2. The system of claim 1 wherein the bump-up command comprises an operator entered bump-up command.

3. The system of claim 2 further comprising at least one of a manual operator switch and a remote control device in operable communication with the charger to provide the operator entered bump-up command thereto.

4. The system of claim 1 wherein the bump-up command comprises an automatically generated bump-up command.

5. The system of claim 4 further comprising:
a bump-up command module operably connected to the charger to selectively transmit a bump-up command thereto; and
at least one of:
an intelligent engine module configured to provide an input to the bump-up command module based on one or more of an identified previous cranking time history, a cranking time duration, or a sensed temperature of the internal combustion engine, so as to cause the bump-up command module to automatically generate the bump-up command; and
a battery management system configured to provide an input to the bump-up command module indicating a sensed very low state-of-charge or state-of-health of the battery system, so as to cause the bump-up command module to automatically generate the bump-up command.

6. The system of claim 1 wherein the charger is programmed to temporarily increase the plurality of supercapacitor cells to the second voltage, after which the voltage of the plurality of supercapacitor cells self-discharge or are depleted in a cranking event and return to the first voltage.

7. The system of claim 1 wherein the charger comprises:
a DC-DC converter to convert the DC battery power to the DC charging current; and
a control module operably connected to the DC-DC converter to control operation of the DC-DC converter;
wherein, responsive to receiving the bump-up command, the control module operates the DC-DC converter to charge the plurality of supercapacitor cells to the second voltage.

8. The system of claim 7 wherein the system further comprises a temperature sensor operably connected to the control module, and wherein the control module is further programmed to:
receive an input from the temperature sensor indicating a temperature of the supercapacitor array; and
when the temperature of the supercapacitor array is below a pre-determined upper temperature threshold, cause the DC-DC converter to charge the plurality of supercapacitor cells to the second voltage.

9. The system of claim 8 wherein the charger is further programmed to control a level of DC charging current provided to the supercapacitor array as a function of the temperature of the supercapacitor array, with a magnitude of the voltage increase of the plurality of supercapacitor cells resulting from the bump-up command decreasing as the temperature of the supercapacitor array approaches the pre-determined upper temperature threshold.

10. The system of claim 1 wherein the charger is sized to enable increasing of the voltage of the plurality of supercapacitor cells from the first voltage to the second voltage within an acceptably short time period, of for instance, 30 to 120 seconds.

11. A charger for charging an arrangement of supercapacitor cells in a starting system for an internal combustion engine with a starter that runs from a battery system that is recharged from the internal combustion engine when running, the charger comprising:

a DC-DC converter configured to convert a DC battery power received from a DC battery to a DC charging current for output to the arrangement of supercapacitor cells;
a control module operably connected to the DC-DC converter to control operation of the DC-DC converter for outputting the DC charging current; and
a bump-up command module operably connected to the control module to selectively transmit a bump-up command thereto;
wherein the control module is programmed to:
receive a bump-up command from the bump-up command module; and
responsive to receiving the bump-up command, cause the DC-DC converter to output DC charging current to the arrangement of supercapacitor cells to temporarily increase a voltage of the arrangement of supercapacitor cells to a higher start-up voltage.

12. The charger of claim 11 wherein the bump-up command is indicative of an upcoming engine start.

13. The charger of claim 12 wherein the control module is programmed to cause the DC-DC converter or an appropriate switched load to remove the bump-up charge from the arrangement of supercapacitor cells should the indicated engine start not take place, thus bringing the arrangement of supercapacitor cells to a long-term holding voltage having a value lower than the start-up voltage.

14. The charger of claim 11 wherein the control module is programmed to perform only a single charging of the arrangement of supercapacitor cells up to the start-up voltage for a received bump-up command.

15. The system of claim 11 wherein the bump-up command module comprises at least one of an operator switch and a remote control device in operable communication with the control module to transmit the bump-up command thereto, the at least one of the operator switch and the remote control device being manually activated by an operator.

16. The system of claim 11 wherein the bump-up command module automatically transmits the bump-up command to the control module responsive to an input from one of an intelligent engine module and a battery management system, the input generated based on a determined previous cranking time history, a sensed temperature of an internal combustion engine, a sensed temperature of the supercapacitor cells, or a sensed state-of-charge or state-of-health of the DC battery.

17. A system for starting an internal combustion engine of a machine that comprises a starter for starting the internal combustion engine and that runs from a battery system that is recharged from the internal combustion engine when running, the system comprising:
a battery system comprising one or more batteries configured to store and output a DC battery power therefrom;
a charger connected to the battery system to receive the DC battery power therefrom and convert the DC battery power to a DC charging current;
a supercapacitor array connected to the charger to receive the DC charging current therefrom, the supercapacitor array comprising a plurality of supercapacitor cells; and
a bump-up command module operably connected to the charger to selectively transmit a bump-up command thereto;
wherein, upon receipt of the bump-up command from the bump-up command module, the charger is programmed to provide DC charging current to the supercapacitor array to increase a voltage of the plurality of supercapacitor cells to a higher engine start-up voltage.

18. The system of claim 17 wherein the bump-up command module generates the bump-up command responsive to a bump-up input received thereby.

19. The system of claim 18 wherein the bump-up command module comprises at least one of a manual operator switch and a remote control device that generates the bump-up input responsive to operator actuation.

20. The system of claim 17 wherein the charger is programmed to perform only a single charging of the plurality of supercapacitor cells up to the engine start-up voltage for a received bump-up command.

* * * * *